Patented Feb. 5, 1952

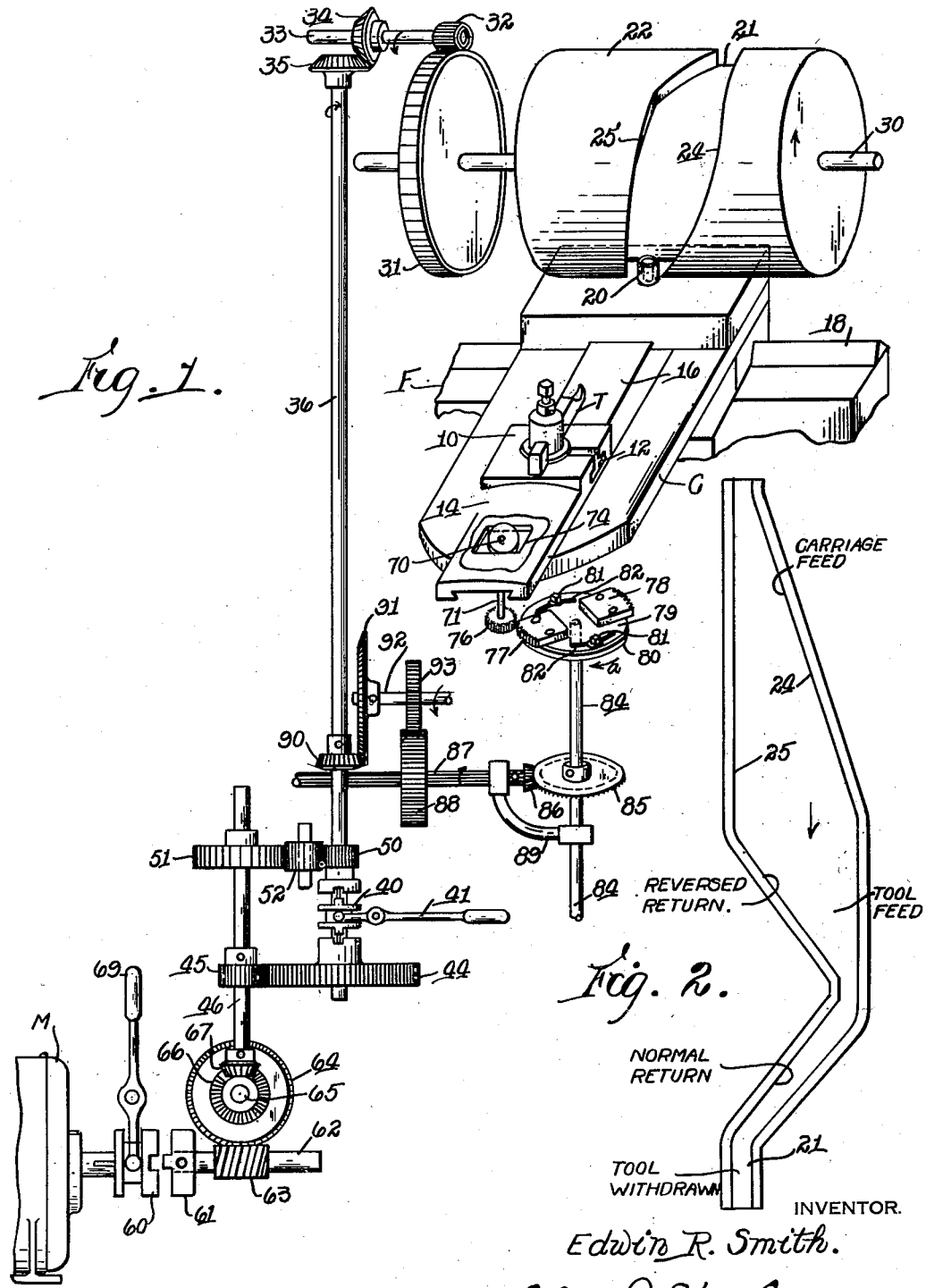

2,584,629

UNITED STATES PATENT OFFICE 2,584,629

POWER-OPERATED MECHANISM FOR MOVING A TOOL SLIDE AND TOOL SLIDE CARRIAGE

Edwin R. Smith, Seneca Falls, N. Y., assignor to Seneca Falls Machine Company, Seneca Falls, N. Y., a corporation of Massachusetts Application March 24, 1948, Serial No. 16,844

2 Claims. (Cl. 82—24)

This invention relates to machine tools, such as lathes, in which a tool is mounted on a tool slide and in which power-operated means is provided to move the tool slide toward and away from the work and also to move the tool slide carriage axially of the work.

It is the general object of this invention to provide improved power-operated mechanism for thus moving a tool slide and a tool slide carriage in predetermined relation.

More specifically, I provide means to introduce a substantial period of delay or dwell on reversal of carriage feed, so that the tool slide may be partially withdrawn before the carriage travel is reversed. This prevents dragging of the point of the tool along the work, which has been found disastrous when using so-called "carbide" tools. These tools will stand high temperature but are easily cracked or broken by irregular or reverse strains.

My invention further relates to arrangements and combinations of parts which will be hereinafter described and more particularly pointed out in the appended claims.

A preferred form of the invention is shown in the drawings, in which

Fig. 1 is a diagrammatic view, partly in perspective, and showing my improved feeding mechanism; and Fig. 2 is a development of a cam drum to be described.

Referring to the drawings, I have shown a tool T mounted in a tool post 10 which is clamped in the usual T-slot 12 of a tool slide 14. The tool slide is mounted on a dove-tailed guideway 16 forming a part of a tool slide carriage C. The carriage C is slidable on a V-shaped guide 18 extending lengthwise of the frame F of the lathe or other machine tool.

The carriage C is provided with a roll 20 which projects into a peripheral groove 21 in a cam drum 22 and which is alternately engaged by the side walls 24 and 25 of the groove 21. The drum 22 is mounted on a shaft 30 having a driving gear 31 engaged by a pinion 32. The pinion 32 is mounted on a countershaft 33 which is connected by bevel gears 34 and 35 to a feed shaft 36. The feed shaft 36 has a double clutch collar 40 keyed thereto and slidable thereon and controlled by a hand shift lever 41.

A feed gear 44 on the shaft 36 is loose on the shaft and is engaged by a pinion 45 fast on a drive shaft 46. A high-speed reverse gear 50 is also loose on the feed shaft 36 and is rotated by a gear 51 on the drive shaft 46 through an idle gear 52.

The feed shaft 36 may thus be rotated through the pinion 45 and gear 44 for normal operation, or may be rotated in a reverse direction through the gear 51, idle gear 52 and pinion 50 and at relatively high speed.

A motor M may be connected through a sliding clutch collar 60 to a clutch member 61 mounted on a worm shaft 62 and having a worm 63 engaging a worm gear 64 mounted on a shaft 65. The shaft 65 is connected to the drive shaft 46 through bevel gears 66 and 67. The clutch collar 60 is controlled by a handle or shift lever 69.

The drive shaft 46 may thus be continuously rotated under the control of the shift lever 69, and the feed shaft 36 may be rotated in either forward or reverse direction or may be placed in neutral by manipulation of the hand shift lever 41.

Special provision is made for advancing the tool T toward the work to a predetermined cutting position before the beginning of a forward movement of the carriage, and for withdrawing the tool at the end of said forward movement.

For this purpose, an eccentric 70 is mounted on an upright shaft 71 and is intermittently rotated between the front and rear walls of a recess 74 formed in the under side of the tool slide 14. A pinion 76 is mounted on the lower end of the shaft 71 and is positioned for successive engagement by segment gear blocks 77 and 78 which are secured on a disc 79. The disc 79 is clamped to a disc 80 by clamping screws 81 which extend through arcuate slots 82 in the disc 79.

The disc 80 is mounted on an upright shaft 84 which is connected by a bevel gear 85 and bevel pinion 86 to a splined shaft 87. The pinion 86 is fast on the shaft 87 and the shaft 87 is axially slidable through a driving gear 88.

The shafts 71, 84 and 87 are rotatable in bearings mounted on and movable with the carriage C. These bearings, as well as many fixed bearings for the shafts 30, 36, 46, etc., are omitted for clearness. Suitable provision 89 is also made for holding the bevel pinion 86 in mesh with the bevel gear 85. The gear 88 is driven from the feed shaft 36 through a bevel pinion 90, bevel gear 91, shaft 92 and gear 93.

The gear ratio is such that the cam drum 22 makes one revolution for each revolution of the shaft 84 and segment gear disc 79.

The segment gear blocks 77 and 78 each have one-half as many teeth as the pinion 76, so that each engagement of a gear block with the pinion 76 rotates the eccentric 70 through 180°.

The development of the cam drum 22 shown in Fig. 2 discloses that the walls 24 and 25 of the groove 21 are substantially separated axially during that part of the revolution of the cam drum which corresponds to the forward or cutting feed of the carriage C and tool T.

The operation and advantages of the feed mechanism above described will now be explained: It will be assumed that the motor M has been connected to the worm shaft 62 through the clutch collar 60 and clutch member 61, and that the gear 44 has been connected through the clutch collar 40 to the feed shaft 36.

The carriage C is further assumed to be approaching the forward end of the cut, and the disc 79 is rotating in the direction of the arrow *a*. The block 77 will thus presently engage the pinion 76 and reverse the eccentric 70, thus withdrawing the tool from the work.

Thereafter the cam roll follower 20 will be engaged by the wall 25 of the groove 21 by continued rotation of the cam drum 22. The carriage C will then be shifted in the reverse direction or to the right in Fig. 1, thus returning the parts to initial position.

While the tool T is thus withdrawn and the carriage C is returning toward the right, a finished work piece may be removed and a new work piece may be substituted, so that the machine may operate continuously and without stopping or reversing the feed shaft 36.

As the cam drum 22 continues its rotation, the block 78 will engage the pinion 76 and will return the tool T to its initial or cutting position, after which the wall 24 of the cam groove 21 will again engage the roll 20 to effect another forward feeding movement.

It sometimes happens, however, that it is necessary to reverse the feed at some intermediate point in a cutting operation. Such reversal may be accomplished by shifting the lever 41 to engage the clutch collar 40 with the reverse pinion 50.

It is essential, however, that the tool T be withdrawn from the work before the carriage C begins such a reverse movement. It is for this purpose that the walls 24 and 25 of the cam groove 21 are spaced apart as indicated in Fig. 2, permitting the drum 22 to be rotated in the reverse direction through a substantial angle before the roll 20 will engage the wall 25.

During this dwell period, the segment gear 78 will engage the pinion 76 and will thus withdraw the tool from cutting position. Damage to the cutting edge of the tool T by reverse movement in cutting position will thus be avoided.

It will be understood that the driving mechanism herein shown is illustrative and largely diagrammatic, and that many changes would be found in a commercial structure. The essential feature is that the tool be withdrawn before reverse carriage feed at the end of the cut, and that the tool be also withdrawn before reverse carriage feed if the cam drum is reversed at some intermediate point in the cut.

Having thus described my invention and the advantages thereof, I do not wish to be limited to the details herein disclosed, otherwise than as set forth in the claims, but what I claim is:

1. In a machine having a carriage movable axially with respect to the work and a tool slide movable on said carriage in a path crossing the axis of the work, a rotatable drum disposed parallel to said axis, follower means on said carriage, cam means on said drum having first and second portions respectively coacting with said follower means to move the carriage forwardly and reversely through rotation of the drum in the same direction, means to rotate the drum forwardly and reversely, said first portion being disposed in an inclined path and so spaced from said second portion that the cam means will disengage said follower means upon reverse rotation of the drum with consequent dwell of the carriage, and means operable during said dwell to withdraw the tool slide in a direction away from the work before return movement of the carriage to protect the tool carried by the tool slide.

2. In a machine having a carriage movable axially with respect to the work and a tool slide movable on said carriage in a path crossing the axis of the work, a reversible rotatable drum disposed parallel to said axis, follower means on said carriage, said drum having a cam surface engaged by said follower means to effect forward movement of said carriage, said drum having a second cam surface engageable by said follower means to effect reverse movement of said carriage on continued rotation of said drum in the same direction, said drum having a third cam surface engageable by said follower means to effect reverse movement of said carriage on reverse rotation of said drum, said first and third cam surfaces being substantially spaced apart circumferentially of said drum so that said follower means will be disengaged by the drum to effect a dwell of the carriage upon any reversal of movement of the drum, and means operable during said dwell to withdraw the tool slide in a direction away from the work before return movement of the carriage, to thereby protect the tool carried by the tool slide.

EDWIN R. SMITH.

REFERENCES CITED

The following references are of record in the file of this patent:

UNITED STATES PATENTS

| Number | Name | Date |
|---|---|---|
| 704,810 | Locke | July 15, 1902 |
| 2,086,846 | Bullard | July 13, 1937 |
| 2,410,026 | Groene et al. | Oct. 29, 1946 |
| 2,440,674 | Bell | May 4, 1948 |

FOREIGN PATENTS

| Number | Country | Date |
|---|---|---|
| 561,727 | Great Britain | June 1, 1944 |